Figure 1:
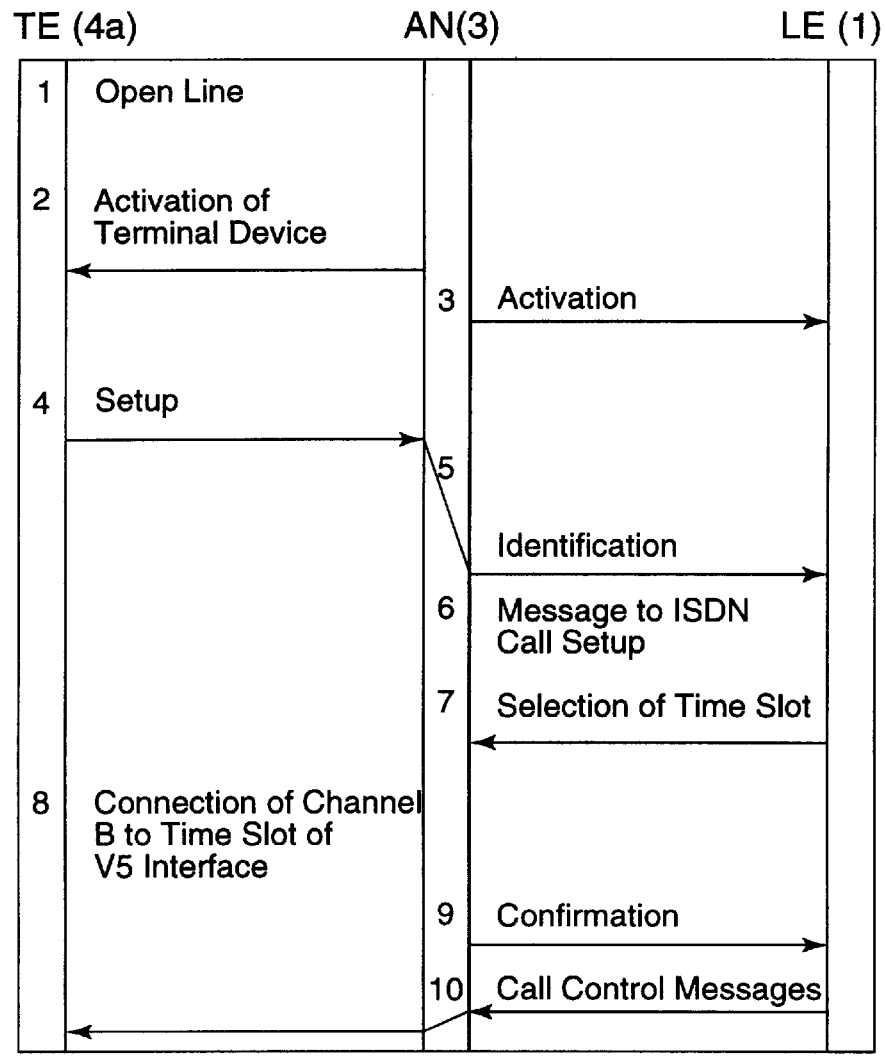

United States Patent
Yrjänä

[11] Patent Number: 6,069,948
[45] Date of Patent: May 30, 2000

[54] PROCEDURE AND SYSTEM FOR ENSURING EMERGENCY COMMUNICATION

[75] Inventor: Martti Yrjänä, Tupos, Finland

[73] Assignee: Nokia Telecommunications Oy, Espoo, Finland

[21] Appl. No.: 09/011,694

[22] PCT Filed: Jun. 18, 1997

[86] PCT No.: PCT/FI97/00393

§ 371 Date: Apr. 1, 1998

§ 102(e) Date: Apr. 1, 1998

[87] PCT Pub. No.: WO97/49231

PCT Pub. Date: Dec. 24, 1997

[30] Foreign Application Priority Data

Jun. 20, 1996 [FI] Finland ................................. 962575

[51] Int. Cl.⁷ .................................................. H04M 7/00
[52] U.S. Cl. ........................................ 379/230; 379/207
[58] Field of Search .................................. 379/279, 188, 379/49, 207, 230, 229

[56] References Cited

U.S. PATENT DOCUMENTS

| | | |
|---|---|---|
| 5,142,571 | 8/1992 | Suzuki et al. . |
| 5,418,776 | 5/1995 | Purkey et al. . |
| 5,509,065 | 4/1996 | Fitzgerald . |
| 5,781,623 | 7/1998 | Khakzar ........................ 379/207 X |
| 5,848,070 | 12/1998 | Durvaux et al. ............... 370/966 X |

FOREIGN PATENT DOCUMENTS

| | | |
|---|---|---|
| 0 337 163 | 10/1989 | European Pat. Off. . |
| 0 730 389 | 9/1996 | European Pat. Off. . |
| 44 22 805 | 11/1995 | Germany . |

OTHER PUBLICATIONS

1993, Patent Abstracts of Japan, vol. 17, No. 470, 5–110669, Apr. 30, 1993.

*Primary Examiner*—Creighton Smith
*Attorney, Agent, or Firm*—Altera Law Group LLC

[57] ABSTRACT

The present invention relates to data communication networks. In particular, the present invention relates to a procedure and a system for ensuring successful emergency communication in a data communication network in which the terminal devices (4a, 4c) are connected to the local exchange via an access node (3) consistent with the V5 standard. In the procedure of the invention, in the event of a failure of the V5 interface used by a subscriber, the subscriber's emergency traffic is directed to emergency lines created locally in the access node. The emergency line is optionally connected to a specified location, such as the teleoperator's customer service.

10 Claims, 2 Drawing Sheets

PROCEDURE AND SYSTEM FOR ENSURING EMERGENCY COMMUNICATION

The present invention relates to data communication networks. In particular, the present invention relates to a procedure as defined in the preamble of claim 1 and to a system as defined in the preamble of claim 9 for ensuring emergency communication in an access node connected to a data communication network and having a number of subscriber lines or subscribers connected to it for the connection of terminal equipment to the data communication network. Furthermore, the present invention relates to a procedure for the testing of the emergency communication feature, as defined in the preamble of claim 7.

There are at least two commonly known methods for connecting subscribers to an exchange in a data communication network. In the first method, the subscriber is connected via a subscriber line directly to the exchange or to an access module connected to it. In the second method, the subscriber is connected to an access network, whose access node is connected to the exchange. Open interfaces (V5.1 and V5.2) between an access network and a local exchange are defined in the ETSI (European Telecommunications and Standards Institute) standards of the ETS 300 324 and ETS 300 347 series. V5 interfaces enable subscribers belonging to a physically separate access network to be connected to a telephone exchange using a standard interface. A dynamic concentrator interface V5.2, consistent with the standards ETS 300 347-1 and 347-2, consists of one or more (1–16) PCM (Pulse Code Modulation) cables. One PCM cable comprises 32 channels, each of which with a transfer speed of 64 kbit/s, i.e. 2048 kbit/s in all. The V5.2 interface supports analogue telephones as used in the public telephone network, digital, such as ISDN (Integrated Services Digital Network) basic and system connections as well as other analogue or digital terminal equipment based on semi-fixed connections.

A static multiplexer interface V5.1, consistent with the standards ETS 300 324-1 and 324-2, consists of one PCM cable with a transfer speed of 2048 kbit/s. The V5.1 interface supports the same subscriber types as the V5.2 interface, except for the ISDN system connection.

The terminal equipment can be connected to the access ports of the access node. One or more V5 interfaces can be connected to an access node. The access ports are created in the V5 interface by linking an unambiguous address of each port with a given address of the V5 interface. In the local exchange, this address is created as a V5 subscriber. In other words, each access port has an address which is linked with a V5 address and uses a given time slot or given time slots for signalling to the local exchange.

The purpose of a system for ensuring emergency communication is to make sure that calls to emergency numbers of subscribers connected to an access node can be set up even when the V5 interface between the access node and the exchange is out of order. The V5.1 and V5.2 standards contain no definition of systems for ensuring emergency communication in case of failure. In this situation, the problem is that, at present, all communication, including emergency communication, via a specific V5 interface of a given subscriber is hindered when the V5 interface fails.

One possibility for ensuring emergency communication in case of failure of a V5 interface assigned to a subscriber is to create in the telephone exchange to which the V5 interface is connected a separate emergency address for each subscriber for communication during the failure situation. However, the problem with this system is the high capacity required in the exchange, because in this case the exchange must have a double subscriber address range as compared with the number of subscribers. In addition, such an arrangement would significantly increase the size of the interface database of the access node.

The object of the present invention is to eliminate the problems described above. A specific object of the invention is to present an effective procedure for ensuring emergency communication in an access node in the event of a failure of the V5 interface used by a subscriber. A further object of the present invention is to present a feature currently missing in the access node that makes it possible to ensure subscribers' emergency communication as long as the access node is in operation.

As for the features characteristic of the invention, reference is made to the claims.

In the procedure of the present invention for ensuring emergency communication in a data communication network comprising a number of telephone exchanges interconnected via trunk cables and an access node connected to at least one of the exchanges, a number of terminal devices used by subscribers to set up connections over the data communication network are connected to the access node, preferably via subscriber cables. Further, in the procedure of the invention, signalling consistent with the V5 standard, which is defined in the standards mentioned above, is used in the connection between the access node and the telephone exchange, which is a standard V5 interface.

In the procedure of the invention, an emergency line is created in the access node by using local operation control commands. The emergency line is generally created in conjunction with the installation and start-up of the access node. In this application, 'emergency line' means an access node subscriber line to which emergency communication is directed when the link between the access node and the local exchange is broken. Emergency communication is preferably controlled by using the internal group switch of the access node. Further, at least one emergency number is created for the emergency line of the access node by using local access node commands. In the event of a failure of the V5 interface used by a terminal device, a call from the terminal device to an emergency number is connected locally by means of the internal group switch of the access node. In the access node, the control of emergency lines and numbers in a failure situation is effected using MML (Man Machine Language) commands.

As compared with prior art, the present invention has the advantage that, using the procedure of the invention, emergency communication of subscribers connected to an access node can be effectively and reliably guaranteed even in the event of a failure of the V5 interface used by the subscriber.

In a preferred embodiment of the present invention, when a new connection is being set up, the status of the V5 interface used by the subscriber is monitored in the access node, and if, based on this monitoring, the V5 interface is found to be out of order, a predetermined connection setup mode is entered in which the connection is set up locally in the access node. In a preferred case, at the monitoring stage, the status of the V5 interface used by the subscriber, i.e. information as to whether the interface is in working order or not, is read from a file used to store status data relating to each V5 interface, i.e. data indicating failure and restoration of the control channel of the V5 interface. A failure situation in a V5 interface occurs when the signalling connection from the subscriber to the local exchange fails.

In a preferred embodiment, the emergency line is connected via a permanent link to a location predetermined by the teleoperator, such as an exchange room, the teleoperator's customer service or the like. In addition, a permanent link can be provided from the emergency line to a mobile telephone, a pager or equivalent. When the teleoperator receives via a data network supervision system or equivalent a message about malfunction of one or more V5 interfaces in an access node, service can be provided via the emergency line connected to the exchange room. In practice, this means that a terminal device connected to the emergency line is attended by a human operator, and calls made to emergency numbers by subscribers connected to the cranky V5 interface will produce a ring in this terminal device and the subscribers can communicate their emergency message via this line. If the call to the emergency number fails to be set up, the subscriber is given a corresponding notice, a sound signal or the like, informing the subscriber about the problem in telephone traffic.

The invention also relates to a procedure for testing the operation of emergency lines and/or emergency numbers created in an access node. The testing procedure is used to ensure that emergency communication via the access node really works. In the testing procedure of the invention, at least two emergency lines are provided in the access ride, so that a connection to an emergency number can be set up from one of the emergency lines. The signalling programmes automatically perform a check to see whether the V5 access port calling an emergency number has a V5 address and whether the calling line has been created as an emergency line for failure situations. If it is established in the access node that the call setup message to an emergency number comes from an emergency line of the access node, then the access node will work in a manner corresponding to operation in a failure situation and the call is connected to the dialled emergency number. Further, if the connection setup to the emergency line is successful, this is an indication that the emergency communication feature is operational. Further, a connection can be set up from the emergency lines in both directions, in other words, first from the first emergency line to the second one and then from the second emergency line to the first one, thus making sure that both emergency lines are in working order. A further advantage of the checking procedure is that the emergency lines can be tested without interrupting normal telephone traffic through the access node.

Further, in the system of the invention for ensuring emergency communication in a data network comprising a number of telephone exchanges interconnected via trunk cables and an access node which is connected to at least one of the exchanges and to which are connected a number of terminal devices used by subscribers to set up connections over the data communication network, signalling according to the V5 standard is used in the connection between the access node and the telephone exchange, which is a V5 interface consistent with the V5 standard. According to the invention, the access node comprises an emergency line created using the local operation control commands of the access node and an emergency number created using the local operation control commands of the access node, and calls to the emergency number are connected to the emergency line. Moreover, the access node of the invention comprises means, preferably an internal group switch within the access node, which group switch is preferably a fully digital, full-scale single-phase time-shared switch without rejection, by which calls made by subscribers to emergency numbers are directed to the emergency line when the V5 interface used by the subscriber is out of order.

Figure 2:
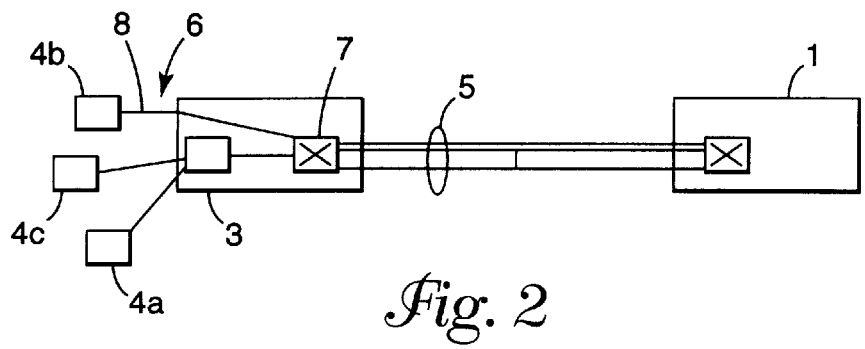

In the following, the invention is described by the aid of a few examples of its embodiments by referring to the attached drawing, in which FIG. 1 presents a prior-art signalling arrangement for a normal call over a V5 interface;

FIG. 2 presents a system according to the present invention; and

Figure 3:
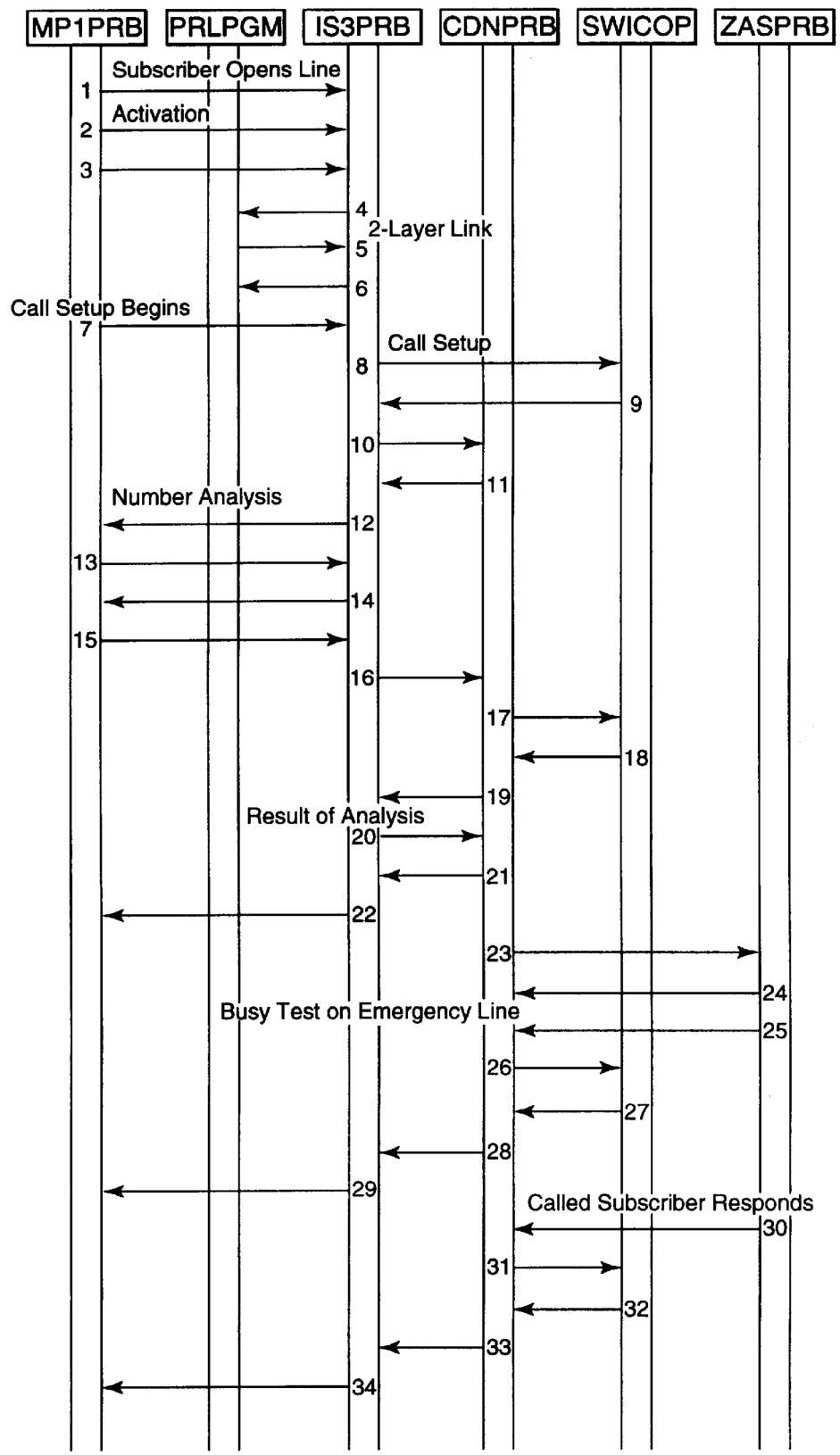

FIG. 3 represets a signalling arrangement in an access node for a call to an emergency number according to the present invention.

FIG. 1 presents an example of the signalling in the case of a prior-art ISDN call over a V5 interface. When the subscriber picks for the headphone (step 1), LAPD signalling (data link layer protocol in ISDN channel D) is started. The access node (AN) 3 activates the terminal device (step 2) and sends a message indicating activation of the terminal device to the telephone exchange (LE) 1 (step 3), using the control protocol. Once activated, the terminal device 4c sends a SETUP message over channel D of the subscriber cable. On receiving the SETUP message, the access node identifies (step 5) the corresponding V5 interface and the V5 subscriber address of the subscriber cable (which in fact is a third-layer address, L3 address, consistent with the OSI architecture (Open System Interconnection)) on the basis of the subscriber cable. Moreover, the access node adds a V5 header to the SETUP message and sends it via the Ds channel of the corresponding V5 interface to the telephone exchange 1. The LAPD signalling itself is passed as such over the V5 interface via the signalling channel reserved for the subscriber. Thus, the V5 interface software in the access node 3 does not interfere with the contents of messages in any way. In the telephone exchange 1, the V5 header is removed (step 6) and the SETUP message is transmitted further to an ISDN call setup control stage, where it is terminated. Based on the first SETUP message, the local exchange selects the V5 time slot to be used, and this information is given to the access node 3 together with the L3 address (step 7). The access node 3 identifies the subscriber cable on the basis of the L3 address received and, via its local group switch, connects (step 8) the B channel of the subscriber cable to the V5 interface time slot reserved for it. Further, the access node 3 sends (step 9) to the telephone exchange 1 a message confirming completion of the connection. The telephone exchange 1 sends the standard ISDN call control messages relating to call setup to the terminal device via the access node over the Ds channel reserved for the subscriber cable (step 10).

The system presented in FIG. 2 comprises an access node 3 with a number of subscribers 4a, 4c connected to it. The access node 3 operates between an exchange 1 and the subscribers 4a, 4c and connects subscribers to a telephone exchange in a data communication network in the manner illustrated by FIG. 1. The access node 3 is connected via a V5.2 interface 5, which comprises 1–16 PCM cables (2 Mbit/s), to the exchange terminal (ET) 10 of the terminal exchange 1, which is provided with the functions required by the V5 interface. The access node can also be connected to the telephone exchange 1 via a V5.1 interface. To ensure successful emergency communication, the access node comprises at least one emergency line 6 created for emergency communication and connected to a specified terminal device via a connection preferably carried out by an operator. A number of emergency numbers are created in the access node 3. For each emergency number, preferably one or more emergency lines are created. Due to the requirements pertaining to the access node, generally no other numbers except emergency numbers are created in it.

In the access node 3, one emergency number at a time can be created and for each emergency line 6, one to six emergency numbers can be created. When the emergency lines are being created, the lines are given with a logical location number so that the command gives the access module number only once, because the series attribute of the emergency numbers in a preferred embodiment is limited to one access module. From the series attribute being limited to one access module it also automatically follows that all emergency lines under a given emergency number must be included in the same access module. In an embodiment, it is possible to create a maximum of 20 emergency numbers for one emergency line, yet the total number of emergency numbers is preferably not more than 20. Moreover, the maximum length of an emergency number is 12 digits. Further, an emergency number cannot be created as a normal subscriber line, and on the other hand a normal subscriber cannot be assigned a line created as an emergency line.

In a preferred embodiment of the present invention, the maximum number of emergency calls that can be active at the same time is 4, which depends on the number of emergency lines. In a further embodiment, the push-button dialling receiver of the access node limits the number of analogue emergency calls at the setup stage to 64. It must be noted, however, that if the subscriber uses pulse dialling, the push-button dialling receiver is released immediately at the beginning of the dialling, permitting a larger number of emergency calls at the setup stage. In the case of digital emergency calls, no push-button dialling receiver is needed.

Next, referring to FIG. 3, the call setup procedure in the case of an ISDN call to an emergency number according to a preferred embodiment of the invention will be described. The program modules presented in the signal chart 3 are used as follows. MB1PRB is a program used for the transmission of LAPD frames, which maintains specific information about the routing direction of signalling in each port and performs the connection of time slots in the access module. PRLPGM is an ISDN $2^{nd}$-layer programme for access node failure situations, which monitors the condition of the Ds channel of the V5 interface and reports changes in the status of the interface. IS3PRS is an ISDN $2^{nd}$-layer programme for access node failure situations, which allocates a module cable for an ISDN subscriber. CDNPRB takes care of actual call setup in emergency communication, connection and disconnection of the speech path, connection of messages and reservation and release of push-button dialling receivers. SWICOP is a progamme controlling the local group switch 7 of the access node. ZASPRB takes care of analogue subscriber signalling. An outgoing ISDN (2B+D) emergency call in the event of a failure of the V5 interface used by the subscriber is as follows. When the subscriber picks up the headphone to call an emergency number, LAPD signalling (data link layer communication protocol in ISDN channel D) is started by the MP1PRB module. IS3PRB acknowledges the activation request. Next, 2-layer connection consistent with the OSI model is set up by means of the PRLPGM and IS3PRB modules. Call setup is now started, and at this point the procedure differs from normal ISDN call setup; as there is no connection to the local exchange, no V5 interface header is included in the message. Further, module IS3PB checks that the required parameters are in order. When the subscriber dials a number it is analyzed by the appropriate programme to establish whether the subscriber is calling an emergency number existing in the access node concerned. If the call is found to be addressed to such an emergency number, then the call setup procedure is continued and the subscriber is given the necessary sound signals to indicate that the system is trying to set up a connection to the emergency number. When the emergency number responds, i.e. when the called subscriber picks up the headphone or performs some other action to answer the calling subscriber's call attempt, a talking connection is set up.

A call setup process as described above can also be carried out from an emergency line created in the access node by making a call from it to an emergency number. This makes it possible to test the emergency lines to make sure that the emergency lines and the access node control system for calls to local emergency numbers are in working order.

Let it be further noted that, in call setup in a failure situation, the emergency line busy test, number analysis and call termination can be carried out in the access node in many known ways, as can the call setup process described above. It should be further noted that the example described above can also be applied to environments other than ISDN, e.g. an analogue environment.

The invention is not restricted to the examples of its embodiments described above, but many variations are possible within the framework of the inventive idea defined by the claims.

I claim:

1. Procedure for ensuring emergency communication in a data communication network comprising comprising a number or telephone exchanges interconnected via trunk cables and an access node connected to at least one of the exchanges, to which access node are connected a number of terminal devices used by subscribers to set up connections over the data communication network, in which procedure signalling according to the V5 standard is used in the connection between the access node and the telephone exchange, which connection is an access node V5 interface consistent with the V5 standard, characterized in that, in the event of a failure of the V5 interface used by a terminal device, a call from the terminal device to an emergency number is connected locally to an emergency line created beforehand in the access node.

2. Procedure as defined in claims 1, characterized in that
when a new connection is being set up, the status of the V5 interface used by the terminal device is monitored in the access node; and
if, based on this monitoring, the V5 interface is found to be out of order, a predetermined connection setup mode is entered in which the connection is set up locally in the access node.

3. Procedure as defined in claim 1, characterized in that data relating to the status of each V5 interface, i.e. data indicating failure and restoration of the control channel of each V5 interface, is stored in a specific file in the access node.

4. Procedure as defined in claim 1, characterized in that the status data stored in a specific file for each V5 interface is utilized when a new connection is being set up.

5. Procedure as defined in claim 1, characterized in that the emergency line is connected via it permanent link to a location predetermined by the teleoperator, such as an exchange room, the teleoperator's customer service or the like.

6. Procedure as defined in claim 1, characterized in that, if the connection fails to be set up, the subscriber is given a corresponding notice, a sound signal to the like.

7. Procedure for testing the operation of a procedure as defined in claim 1, characterized in that
from one of two emergency lines created in advance, a connection is set up to an emergency number and the signalling programmes of the access node automatically perform a check to see whether the V5 access port in question has a V5 address;

a check is made to establish whether the calling line has been created as an emergency line for failure situations;

if a connection to the emergency line is successfully set up, this is an indication that the emergency lines are operational.

8. Procedure as defined in claim 7, characterized in that a connection is be set up from the emergency lines in both directions, i.e. from the first emergency line to the second one and from the second emergency line to the first one.

9. System for ensuring emergency communication in a data network comprising a number of telephone exchanges (1, 1*a*) interconnect via trunk cables (2) and an access node (3) which is connected to at least one of the exchanges and to which are connected a number of terminal devices (4*a*, 4*b*, 4*c*) used by subscribers to set up connection over the data communication network, in which system signalling according to the V5 standard is used in the connection between the access node and the telephone exchange, which connection is an access node V5 interface (5) consistent with the V5 standard, characterized in that the access node comprises an emergency line (6) created using the local operation control commands of the access node;

an emergency number created using the local operation control commands of the access node, and calls to the emergency number are connected to the emergency line; and means (7) by which calls made by subscribers to emergency numbers are directed to the emergency line when the V5 interface used by the subscriber is out of order.

10. System as defined in claim 9, characterized in that the system comprises means (8) connected to the emergency line for setting up a connection to a specified terminal device (4*b*) via the emergency line.

* * * * *